United States Patent [19]

Strecker et al.

[11] 3,965,081

[45] June 22, 1976

[54] ISOTACTIC AND SYNDIOTACTIC POLYVINYL NITRATES AND PROCESSES FOR THEIR FORMATION

[75] Inventors: Richard A. Strecker, Feasterville; Frank D. Verderame, Huntingdon Valley, both of Pa.

[73] Assignee: The United States of America as represented by the Secretary of the Army, Washington, D.C.

[22] Filed: Jan. 21, 1974

[21] Appl. No.: 435,344

[52] U.S. Cl. ................................ 526/9; 149/19.91; 204/159.23; 526/311; 526/330; 526/332; 526/10
[51] Int. Cl.² .................... C08F 126/02; C08F 8/30
[58] Field of Search ............. 260/91.3 VA; 450/603

[56] References Cited
UNITED STATES PATENTS 3,669,924   6/1972   Daume et al................... 260/45.9 R

*Primary Examiner*—Stanford M. Levin
*Attorney, Agent, or Firm*—Nathan Edelberg; Robert P. Gibson; Kalman Pollen

[57] ABSTRACT

Stereoregular polyvinyl alcohol in acetic anhydride reacts with anhydrous nitric acid at −10° to −15°C to form new stereoregular polyvinyl nitrate which is useful as a base for propellant compositions and compares favorably in physical and chemical properties to nitrocellulose.

3 Claims, No Drawings

ISOTACTIC AND SYNDIOTACTIC POLYVINYL NITRATES AND PROCESSES FOR THEIR FORMATION

The invention described herein may be manufactured, used, and licensed by or for the Government for governmental purposes without the payment to us of any royalty thereon.

This invention relates to propellants and more particularly to improved propellant binder compositions.

Atactic polyvinyl nitrate, or polyvinyl nitrate having no stereoregular configuration, is well known and has been long contemplated for use in propellant compositions. Two factors, however, have militated against its successful application. First, the tendency of atactic polyvinyl nitrate to flow when mixed with other materials rendered it incapable of being used in applications where maintenance of a specific surface was necessary. Second, the inherently sticky nature of atactic polyvinyl nitrate propellant compositions led to problems in the extrusion or molding of the material into propellant grains. Until now, no known solution has been found for overcoming these difficulties.

Thus, it is an object of this invention to form polyvinyl nitrates which do not suffer the disadvantages aforementioned.

Another object of the invention is to provide polyvinyl nitrates having high energies.

These and other objects, will be readily apparent from the following description.

We have found that when stereoregular polyvinyl alcohol in acetic anhydride is reacted with anhydrous nitric acid at temperatures of $-15°C$ to $-10°C$, a substance of surprising and unexpected physical properties results. The substance, stereoregular polyvinyl nitrate, is crystalline, dry, dimensionally stable, and possesses powerful propellant energies.

In the nitration of the stereoregular polyvinyl alcohol, nitryl chloride or nitronium tetrafluoroborate may be substituted for anhydrous nitric acid. It is important in these reactions that no significant amount of water be present since water may hydrolyse the stereoregular polyvinyl nitrate polymers and destroy their stereoregularity. When using anhydrous nitric acid, the water scavenger acetic anhydride picks up water from the reaction as soon as water is formed as a by-product. When using nitryl chloride or nitronium tetrafluoroborate, no water is formed.

The reaction producing new stereoregular polyvinyl nitrate is symbolized by equation 1 below:

PVA + x  PVN  (Equation 1)

where PVA is stereoregular polyvinyl alcohol; x is the nitrating agent plus solvent, and PVN is stereoregular polyvinyl nitrate; and wherein x may be anhydrous nitric acid plus acetic anhydride; or nitronium tetrafluoroborate or nitryl chloride in tetramethylene sulfone or acetonitrile. The reaction will preferably be carried out at temperatures ranging between $-10°C$ to $-15°C$. At temperatures below $-15°C$, nitration will not be sufficiently high for desirable results; the low temperatures apparently slow down the nitration reaction. Above $-10°C$, oxidation of the polymer will occur instead of nitration, a result typical in nitration reactions which usually require low temperatures.

Stereoregular polyvinyl alcohol, the starting material in the synthesis, may be prepared according to the method described by Okamura, Kodama, Higashimura, in Makromolekulare Chemi 53; pp. 180–191, 1962: T-butyl vinyl ether is washed with water to eliminate traces of alcohols, dehydrated over KOH and distilled over metallic sodium before use. Since t-butyl vinyl ether is extremely unstable, poly-t-butyl vinyl ether of high molecular weight will be obtained only when freshly distilled monomer is used. In the polymerization, the t-butyl vinyl ether is added to a catalyst, $BF_3(C_2H_5)_2$, in toluene. Low reaction temperatures of $-78°C$ are used, the reaction times of 60–90 minutes being employed. Cationic homogeneous polymerization of the t-butyl vinyl ether monomer occurs to yield isotactic poly-t-butyl vinyl ether. It is important in obtaining high stereoregularity of the poly-t-butyl vinyl ether that t-butyl vinyl ether be added to the catalyst solvent mixture gradually rather than adding the catalyst plus solvent to t-butyl vinyl ether in which case heterogeneous polymerization occurs. Poly-t-butyl vinyl ether is next converted to isotactic polyvinyl alcohol in the following manner: Hydrogen bromide gas is passed by means of a bubbler tube into a solution of poly-t-butyl vinyl ether (usually 1 gram per 100 ml toluene or chloroform) for ten minutes at 0°C. The product that is formed, stereoregular polyvinyl alcohol, is washed with alkaline methanol and then dried in a vacuum. The stereoregular polyvinyl alcohol so obtained is now ready for use in the synthesis of stereoregular polyvinyl nitrate.

If syndiotactic polyvinyl nitrate is desired, then synthesis proceeds through nitration of syndiotactic polyvinyl alcohol which is prepared in a manner disclosed in the Journal of Polymer Science, Part A, Vol. 1, pages 951–964 (1963), *Syndiotactic Polyvinyl Formate and Derived Polyvinyl Alchol*, Rose, McCain, Endrey and Sturm. The synthesis proceeds in the following manner: Formic acid is reacted with acetylene as disclosed in U.S. Pat. No. 2,329,644, issued Sept. 14, 1943, entitled Catalytic Composition. Thus, the reaction proceeds at 10°–20°C in the presence of mercuric acetate and boric acid, the latter serving as an activating substance. The reaction produces vinyl formate; and after a crude distillation, fractionation through a spinning band column, a highly pure monomer, b.p. 45.3°–45.7°C results. The polymerization of vinyl formate is next carried out under lamp grade nitrogen in a three-necked flask equipped with a stirrer, thermometer, gas inlet and outlet tubes, and reflux condenser. The preferred catalyst is ultraviolet lightactivated azobisisobutyronitrile (AIBN) at a concentration of 1 millimole/mole of the vinyl formate monomer. The reaction is carried out preferably at low temperatures of $-20°C$ to 0°C, preferably $-20°C$, where greater stereoregularity of the resulting polymer is achieved. Reaction is carried out for a period of 1–2 hours. Any unreacted monomer is recovered by vacuum distillation. The resulting polymer, polyvinyl formate, is purified by dissolution in $CHCl_3$, followed by precipitation in methanol or hexane. The dissolution and precipitation steps are carried out twice. The polyvinyl formate is next dissolved in dioxane and converted to polyvinyl alcohol by alcoholysis with a 10 percent solution of sodium methoxide-methanol in dioxane. Reaction is carried out at a temperature of 40°C for 24 hours in a 300 ml Erlenmeyer flask. Precipitation in methanol yields solid polyvinyl alcohol.

Stereoregular polyvinyl nitrate, isotactic or syndiotactic, formed in accordance with our invention, in addition to its inherently excellent physical and chemical properties, also possesses several further desirable qualities. It is most suitable as a propellant base, allowing production of high energies. Moreover, should further or alternate treatment of the stereoregular polyvinyl nitrate in any manner be desired, synthetic PVN may be readily modified because of its readily modifiable structure. Thus, for example, one may modify the structure with respect to the number of nitrated sites; or by proper blend of isotactic and syndiotactic polymers one may vary the properties of the final product. Our stereoregular PVN appears as a polymer of approximately 20,000–50,000 units, each unit having a molecular weight of 90. The invention may be better understood by reference to the following illustrative examples:

thereafter. Then the temperature is allowed to rise slowly to about 20°C in about 90 minutes, and stirring is continued for 45 additional minutes. The resulting slurry is poured into a beaker of crushed ice and water to precipitate the stereoregular polyvinyl nitrate polymer. The product obtained, stereoregular polyvinyl nitrate, is dissolved in acetone, then reprecipitated by pouring into 5 percent sodium carbonate solution to neutralize the acid on the polymer. The softening point of the stereoregular polyvinyl nitrate is 65°–90°C. The sample gave an X-ray spectrum very rich in well oriented reflections thus indicating the stereoregularity of the polyvinyl nitrate.

The following compositions in Table I below illustrate typical composite substances containing the stereoregular propellant base.

TABLE I

STEREOREGULAR PVN PROPELLANT COMPOSITIONS

| COMPOSITION No. | 1 | 2 | 3 | 4 |
|---|---|---|---|---|
| PVN (Stereoregular) | 20% | 24% | 19% | 28.5% |
| HMX | 65 1/2% | 61 1/2% | 0% | 0% |
| RDX | 0% | 0% | 66 1/2% | 57% |
| Plasticizer | 10% DBP | 10% DEGDN | 10% TA | 10% TMETN |
| Deterrent | 3% ECTL | 3% DNT | 3% DNT | 3% ECTL |
| Flash Inhibitor | 1/2% KNO₃ | 1/2% KNO₃ | 1/2% KNO₃ | 1/2% KNO₃ |
| Stabilizer | 1% DPA | 1% DPA | 1% DPA | 1% DPA |

DBP — dibutyl phthalate
DEGDN — diethyleneglycol dinitrate
TA — triacetin
TMETN — trimethylethane trinitrate
ECTL — ethyl centralite
DNT — dinitrotoluene
PVN — tactic or stereoregular polyvinyl nitrate
DPA — diphenylamine
HMX — cyclotetramethylene tetranitramine
RDX — cyclotrimethylene trinitramine

EXAMPLE I

A slurry is made by mixing isotactic polyvinyl alcohol, 26.5 g, with acetic anhydride, 265 ml, or 286 g. Then anhydrous nitric acid, 143 g, is added gradually to the slurry. The temperature of the slurry is maintained at −15°C – −10°C during addition and for one hour

We claim:
1. Stereoregular polyvinyl nitrate.
2. Composition according to claim 1 wherein the stereoregular polyvinyl nitrate is isotactic.
3. Composition according to claim 1 wherein the stereoregular polyvinyl nitrate is syndiotactic.

* * * * *